March 4, 1952     D. S. ATKINSON     2,587,679
ADJUSTABLE SEAT FOR AUTOMOBILES
Filed April 28, 1950     2 SHEETS—SHEET 1
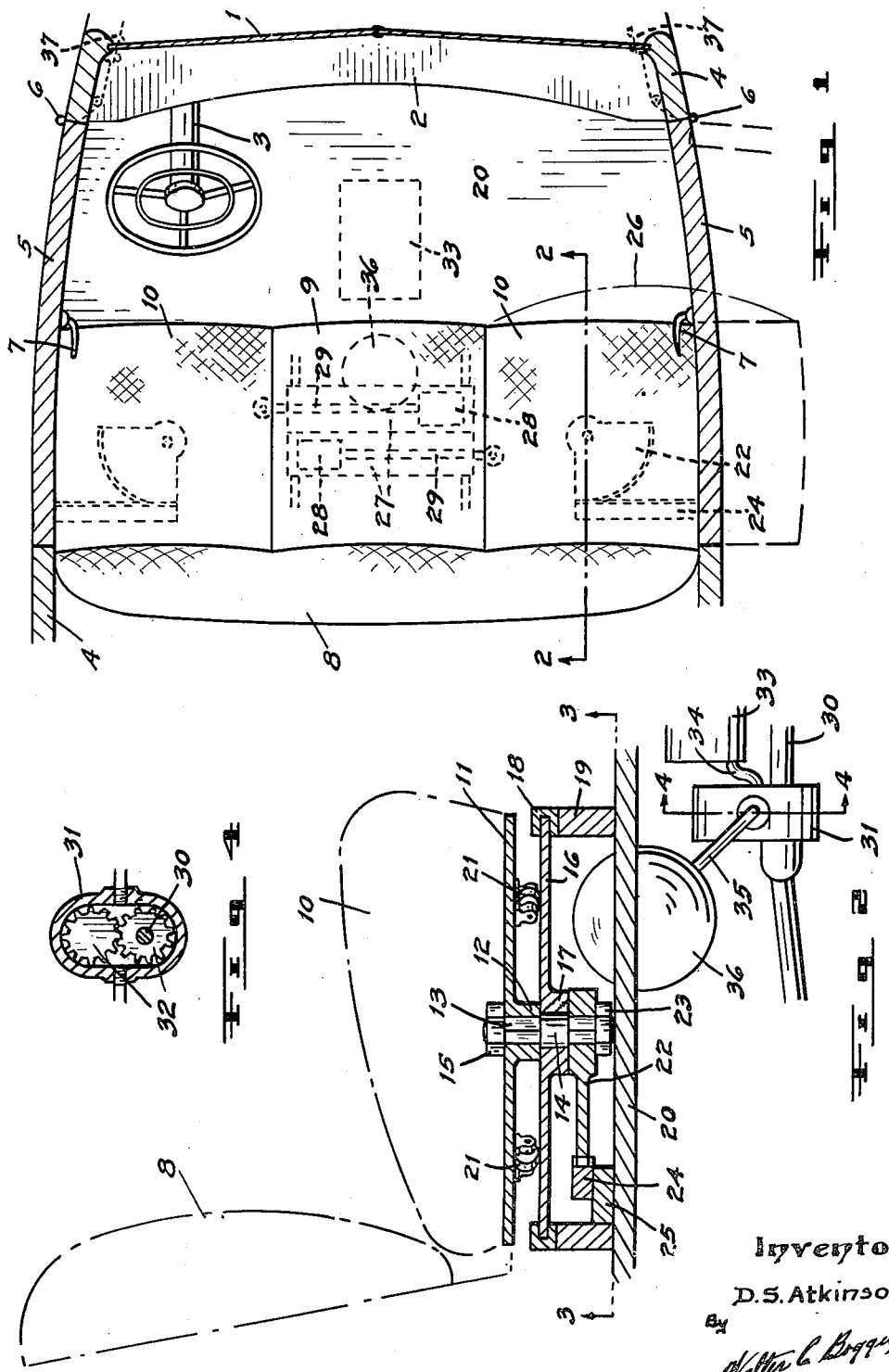
Inventor
D. S. Atkinson
By
Walter C. Briggs
AGENT

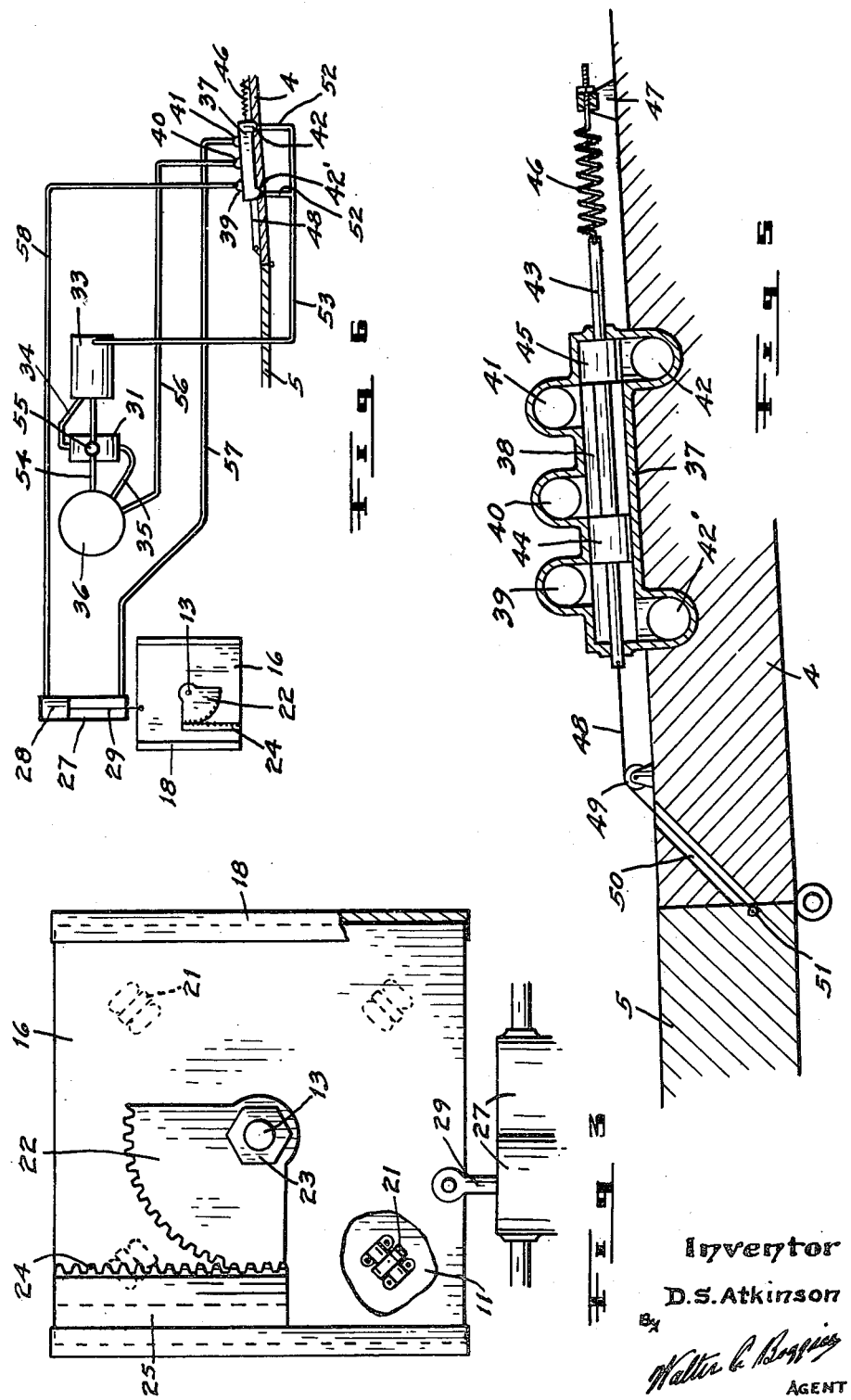

Patented Mar. 4, 1952

2,587,679

UNITED STATES PATENT OFFICE 2,587,679

ADJUSTABLE SEAT FOR AUTOMOBILES

Dale S. Atkinson, Winnipeg, Manitoba, Canada

Application April 28, 1950, Serial No. 158,671

2 Claims. (Cl. 296—65)

The invention is particularly designed to assist passengers entering or leaving an automobile and the principal object thereof is to provide a swingable seat whereby the said passengers can open the door and swing around for exit from, or can sit on the seat and swing into the vehicle.

A further object of the invention is to construct the device such that the seat section will move bodily outward from the automobile at the same time as it turns so that the passenger can leave the seat or sit thereon while his or her feet are on the sidewalk.

A further object of the invention is to provide a mechanism for operating the seat and said mechanism controlled by the opening or closing movement of the door.

A further object of the invention is to construct the device such that the seat sections will be operated at a speed corresponding to the movement of the door, that is; if the door is opened slowly the seat section will move slowly and should the door be opened quickly, the seat section will move accordingly.

A still further object of the invention is to construct the device in a sturdy and reliable manner and such that the control mechanism will be simple, operate smoothly, and the device will give service over a long period of time.

With the above important and other minor objects in view, which will become more apparent as the description proceeds, the invention consists essentially in the construction, arrangement and design of the various parts hereinafter more particularly described, reference being had to the accompanying drawings in which:

Figure 1 is a horizontal sectional view of an automobile showing the seat sections and doors, with various parts in dotted outline and a seat projecting, in broken lines.

Figure 2 is an enlarged vertical sectional view taken on the line 2—2, Figure 1.

Figure 3 is an inverted horizontal section taken on the line 3—3, Figure 2 and showing the operating mechanism for the seat.

Figure 4 is a vertical section through the pump and taken on the line 4—4, Figure 2.

Figure 5 is an enlarged horizontal sectional view showing the control mechanism for the seat connected to the door.

Figure 6 is a diagrammatic lay-out of the various pipe connections between the different parts of the device.

In the drawings like characters of reference indicate corresponding parts in the several figures.

An interior plan of the central part of an automobile is generally illustrated in Figure 1 and comprises the usual windshield 1, dash 2, steering post 3 and walls 4 provided with doors 5, hinged at 6 to the walls. The lock mechanism of the doors (not shown) is operated by interior handles 7 while the back cushion of the front seat is indicated at 8. The front seat is formed in three sections; a central fixed section 9 with movable side sections 10 on either side, the operation of which will now be described.

Each of the sections 10 comprises a cushion which is supported from a relatively square base 11. This base is provided with a central, downwardly extending boss 12 having a square hole therein. A pivot spindle is indicated at 13 and comprises a square shaft having a central circular portion 14 while the extreme ends are circular and threaded. One square end of this spindle is received in the square hole of the base 11 and a nut 15 is screwed thereon to hold the base 11 firmly against the circular portion 14. A square plate 16 is also provided with a central boss 17 and the sides of the plate are slidably received in guides 18 carried by supporting members 19 from a floor 20 of the automobile. The circular portion 14 of the spindle is rotatably received within the boss 17 so that the plate 16 supports the boss 12 and base 11 thereon for rotation. To relieve the central part of the plate 16 from the full weight of the base 11 and to keep the base 11 fairly level, suitable rollers 21 are carried from the bottom face of the base 11 and these rollers rotate on the plate 16. The lower square shaft of the pivot spindle receives a segmental gear 22 which is secured to the spindle by a nut 23 on the spindle threads. The teeth of this segmental gear are meshed with the teeth of a rack 24 which is carried on a member 25 positioned on the floor 20.

From the above description it will be seen that the plate 16 is free to slide sideways in the guides 18 to move the seat section 10 outwardly through the doorway opening and in such movement the segmental gear, travelling over the rack 24, will cause rotation of the pivot spindle and the seat section approximately 90°. The line of movement of the front interior corner of the seat section is indicated by the dot and dash line 26. Accordingly, a passenger, normally sitting in the seat, can open the door and then swing the seat section so that his or her feet swing out onto the sidewalk ready for standing up.

A pair of cylinders 27 are positioned below the fixed seat 9 and transversely of the automobile. Each of these cylinders are interiorly provided with a piston 28 which, through a rod 29, is connected to one or other of the plates 16 of the seat sections 10. When fluid pressure enters the cylinder 27, behind the end of one of these pistons, this pressure will cause the pistons to move along the cylinder and accordingly move the plates 16 along the guides 18 for the swinging movement of the seat sections.

The transmission of the automobile is generally indicated by the reference 30 in Figure 2. This transmission is connected to a casing 31 containing a pair of meshed gears 32, one of which is driven by said transmission. These gears and the casing form a gear pump. A fluid supply tank is indicated at 33, and through a pipe 34, feeds to one side of the gear pump. The opposite side of the gear pump is connected by a pipe 35 with a spherical container or accumulator 36. When the transmission 30 is operating, the pump receives fluid from the supply tank 33 and will deliver same to the accumulator and build up a pressure therein.

A casting 37 is positioned on the interior wall of the automobile, below the dash, and one is provided for each door. Each casting comprises a cylinder 38 having three outlets or ports 39, 40 and 41 centrally on one side thereof. Further ports 42 and 42' are provided at each end of the cylinder on the opposite side thereof. A shaft 43 passes lengthwise through the cylinder, is provided with a pair of spaced pistons 44 and 45 therein, and one end of the shaft is connected to a coil spring 46 which has the opposite end adjustably carried by a bracket 47 on the wall. The opposite end of the shaft 43 is connected to a cable 48 which passes over a pulley 49 and through an opening 50 in the wall for connection at 51 to the door 5.

From the above construction it will be seen that, when the door is opened it pulls the cable 48 and so endwise shifts the pistons 44 and 45 and tensions the spring 46. When the door is shut, the cable slackens, and the spring 46 returns the pistons to their original position. This endwise movement of the pistons permit the various ports to make connections one with the other and accordingly, the casting forms a control valve for operation of the pistons 28 of the seat sections, and which will now be described.

Observing Figure 6, it will be seen that a pair of pipes 52 lead to the ports 42 and 42'. These pipes are connected to a single pipe 53 which passes over to and connects with the fluid supply tank 33. A pipe 54 connects the accumulator with the supply tank and is provided with a check valve, indicated at 55, so excess pressure in the accumulator can be relieved back to the supply tank. A pipe 56 leads from the accumulator and connects with the port 40 of the control valve. A pipe 57 connects the port 41 of the control valve with one end of the cylinder 27. The opposite end of this latter cylinder is connected by a pipe 58 with the port 39 of the control valve.

In the operation of the automobile, the accumulator will always be under fluid pressure. By observing Figure 5 it will be seen that the ports 40 and 41 are connected through the cylinder 38 (between the pistons 44 and 45), so that fluid from the accumulator passes along the pipe 57 and maintains the piston 28 at one end of the cylinder 27 and the respective seat section is in normal position. However, when the door 5 is opened, the cable 48 draws the pistons 44 and 45 along the cylinder 38 and the port 41 will first be closed and then opened to the port 42, while the ports 39 and 40 are connected (between the pistons 44 and 45), and the port 42' is shut off. Accordingly, the fluid pressure from the accumulator passes up the port 40, across to the port 39, along the pipe 58 and moves the piston 28 along the cylinder 27 and so moves the seat section 10 rotatably outward through the door opening and with it the passenger sitting on the cushion. At the same time, the fluid displaced from the opposite end of the cylinder 27, passes along the pipe 57 to the port 41 and exhausts through the connected port 42 back to the fluid supply tank 33. When the door 5 is shut, the spring 46 draws the pistons 44 and 45 back to the original position, shown in Figure 5, and the reverse movement of the seat section occurs. The fluid pressure from the port 40 passes to the port 41, down the pipe 57, and moves the piston 28 back to the position shown and the exhausting fluid passes along the pipe 58 to the port 39 and exhausts through the port 42' back to the supply tank. It will be noted that the pistons 44 and 45, in passing over the ports 39 and 41, have a variable control over the fluid movement so that, if the door is opened slowly, the seat section will be rotated slowly whereas, if the door is opened quick, the operation of the seat section will be fast.

While in the present instance I have been shown the seat sections operated by door controlled pressure, it will be understood that the control valve need not be operated by the door but could be operated from any other part of the automobile, if desired. While fluid pressure operation has been illustrated, other controlled power means could be used to move the plates 16 for the same purpose. In this connection, it might also be mentioned, that power operated seat sections may be too expensive for certain types of automobiles and therefor I do not wish to be limited to such power operation as the seat sections can be manually operated by the sitting passenger simply by using his feet to turn both the seat section and his own body around. When so rotated, the segmental gear will ride the rack to move the seat section outwardly. The door of course will be manually opened by the passenger before this rotation commences.

What I claim as my invention is:

1. In combination with an automobile having a floor and a side wall defining a door opening and said opening normally closed by a door hinged to said side wall; an adjustable seat for said automobile, comprising: transverse guides supported by said floor; a plate member mounted for sliding movement on said guides; a seat section normally positioned within said automobile and receivable by said plate member for rotation thereon in the sliding movement thereof on said guides; power means for moving said plate member along said guides, comprising a piston slidably mounted in a cylinder and connected to said plate member; a fluid control valve mounted adjacent and connected to said door; a source of fluid pressure connected to said control valve; fluid connections between said control valve and said cylinder; said control valve, operable by the opening movement of said door, to connect said source of fluid pressure to one end of said cylinder and operate said piston to move said seat section toward said door opening; said control valve, operable by the closing movement of said door, to connect said source of fluid pressure to the opposite end of said cylinder and operate said piston to return said seat section to its normal position within said automobile; and means on said control valve for relieving fluid pressure from the exhausting end of said cylinder during the movement of said piston.

2. In combination with an automobile having a floor and a side wall defining a door opening; an adjustable seat for said automobile, comprising: transverse guides supported by said floor; a plate member mounted for sliding movement on said guides; a seat section normally positioned within said automobile and receivable by said plate member for rotary movement thereon in the sliding movement thereof on said guides; power means for moving said plate member along said guides, comprising a piston slidably mounted in a cylinder and connected to said plate member; a pump for delivering pressured fluid to said cylinder; a control valve connected between said pump and said cylinder for controlling said pressured fluid thereto; said control valve operable to deliver said pressured fluid to one end of said cylinder and cause said piston to move said plate member along said guides toward said door opening; an said control valve operable to deliver said pressured fluid to the opposite end of said cylinder and cause said piston to return said plate member back along said guides to normal position; and means on said control valve for relieving fluid pressure from the exhausting ends of said cylinder to the intake side of said pump during the movement of said piston and form a closed circuit for said fluid; and means for operating said pump.

DALE S. ATKINSON.

REFERENCES CITED

The following references are of record in the file of this patent:

UNITED STATES PATENTS

| Number | Name | Date |
| --- | --- | --- |
| 1,682,989 | Smelker | Sept. 4, 1928 |
| 2,117,409 | Dorsey | May 17, 1938 |
| 2,242,247 | Grant | May 20, 1941 |
| 2,290,464 | Buchheit | July 21, 1942 |
| 2,432,895 | Horton | Dec. 16, 1947 |

FOREIGN PATENTS

| Number | Country | Date |
| --- | --- | --- |
| 306,860 | Germany | July 17, 1918 |
| 368,481 | Italy | Feb. 16, 1939 |